(12) United States Patent
Jang et al.

(10) Patent No.: US 8,723,876 B2
(45) Date of Patent: May 13, 2014

(54) IMAGE FORMING APPARATUS AND METHOD OF CONTROLLING THE SAME

(75) Inventors: Young-jun Jang, Seongnam-si (KR); Seung-hoon Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 13/015,686

(22) Filed: Jan. 28, 2011

(65) Prior Publication Data
US 2012/0019544 A1 Jan. 26, 2012

(30) Foreign Application Priority Data
Jul. 22, 2010 (KR) .......................... 10-2010-0070985

(51) Int. Cl.
*G06F 13/00* (2006.01)

(52) U.S. Cl.
USPC ........... 345/538; 345/531; 345/537; 345/547; 345/557

(58) Field of Classification Search
USPC .......................... 345/531, 537, 538, 547, 557
See application file for complete search history.

(56) References Cited

U.S. PATENT DOCUMENTS
2007/0130442 A1* 6/2007 Lee et al. ...................... 711/207

OTHER PUBLICATIONS

"Linux: Adaptive Readahead", KernelTrap, May 26, 2006, pp. 1-17, retrieved Apr. 20, 2010, http://kerneltrap.org/node/6642.

* cited by examiner

*Primary Examiner* — Maurice L McDowell, Jr.
(74) *Attorney, Agent, or Firm* — Sughrue Mion, PLLC

(57) ABSTRACT

An image processing apparatus is provided that includes a main memory; at least one sub-memory that stores data, a cache memory that temporarily stores data, and controller that controls whether to temporarily store the data in the cache memory selectively with respect to each of the at least one sub-memory.

19 Claims, 3 Drawing Sheets

IMAGE FORMING APPARATUS AND METHOD OF CONTROLLING THE SAME

CROSS-REFERENCE TO RELATED APPLICATION

This application claims priority from Korean Patent Application No. 10-2010-0070985, filed on Jul. 22, 2010 in the Korean Patent Office, the disclosure of which is incorporated herein by reference.

BACKGROUND

1. Field

Apparatuses consistent with the exemplary embodiments relate to an image forming apparatus which processes an image signal input from the outside to be displayed as an image based on a preset process and a method of controlling the same, and more particularly, to an image forming apparatus which has an improved structure in which data to be implemented by a CPU is loaded to a main memory and a method of controlling the same.

2. Description of the Related Art

An image processing apparatus processes an image signal received from the outside based on various processes for image processing, and displays the image signal as an image on a display panel provided therein or outputs the processed image signal to an external device to display an image when a display panel is not provided. When a system power is applied to a display device which is turned off, a system driving data including a software operating system is implemented by a central processing unit (CPU) to turn on the system, and to process image data to be displayed as an image or to implement a predetermined application in the operating system.

In the image processing apparatus, data is loaded to a main memory and then processed by the CPU, and the data is read from a sub-memory connected to the CPU and the main memory through a system bus and provided in various formats.

However, the main memory generally has limited capacity, and thus data corresponding to a process being implemented is selectively loaded to the main memory among data stored in the sub-memory. However, a data input/output speed (i.e., a data transfer speed) of the sub-memory is relatively slow as compared with a processing speed of the CPU, thereby influencing an overall processing speed of the system. Thus, there are suggested various methods to enhance the processing speed of the system as the image processing apparatus is improved in structure in which data stored in the sub-memory is loaded to the main memory.

SUMMARY

According to one or more exemplary embodiments, there is provided an image processing apparatus including a main memory; at least one sub-memory which stores data; a cache memory that is configured to temporarily store data; and a controller which controls whether to temporarily store the data in the cache memory in transferring the data from the at least one sub-memory to the main memory, or to transfer the data directly from the sub-memory to the main memory selectively with respect to each of the at least one sub-memory.

The controller may set whether to temporarily store the data in the cache memory differently with respect to each of the at least one sub-memory based on characteristics of the data stored in each of the at least one sub-memory.

The controller may set the data read from a first sub-memory of the at least one sub-memory to be temporarily stored in the cache memory when the data stored in the first sub-memory is image data.

The controller may set the data read from a second sub-memory of the at least one sub-memory not to be temporarily stored in the cache memory when the data stored in the second sub-memory is system driving data.

The at least one sub-memory may include a first sub-memory to store image data and a second sub-memory to store system driving data of the image processing apparatus, and the second sub-memory may have a faster data input/output speed than the first sub-memory.

The first sub-memory may include at least one of a hard disk drive, a digital video disc (DVD) player, and a blue ray disk player.

The second sub-memory may include a flash memory.

The controller may designate a size of the data read one time from the first sub-memory.

The controller may set whether to use the cache memory based on a readahead algorithm provided by LINUX.

The image processing apparatus may include a user input unit provided to set whether to temporarily store the data in the cache memory with respect to each of the at least one sub-memory.

The cache memory may have a faster data input/output speed than the at least one sub-memory.

According to one or more exemplary embodiments, there is provided a method of controlling an image processing apparatus which comprises a main memory, at least one sub-memory which stores data, and a cache memory which temporarily stores the data before loading the data from the at least one sub-memory to the main memory. The method comprises setting whether to temporarily store data in the cache memory for each of the at least one sub-memory; reading data from one of the at least one sub-memory; and selectively performing temporary storage of the read data in the cache memory based on the setting for the one of the at least one sub-memory for reading the data.

The setting may include setting whether to temporarily store the data in the cache memory differently with respect to each of the at least one sub-memory based on characteristics of the data stored in each of the at least one sub-memory.

The setting whether to temporarily store the data in the cache memory differently with respect to each of the at least one sub-memory based on characteristics of the data stored in each of the at least one sub-memory may include setting the data read from a first sub-memory of the at least one sub-memory to be temporarily stored in the cache memory when the data stored in the first sub-memory is image data.

The setting whether to temporarily store the data in the cache memory differently with respect to each of the at least one sub-memory based on characteristics of the data stored in each of the at least one sub-memory may include setting the data read from a second sub-memory of the at least one sub-memory not to be temporarily stored in the cache memory when the data stored in the second sub-memory is system driving data.

The at least one sub-memory may include a first sub-memory to store image data and a second sub-memory to store system driving data of the image processing apparatus, and the second sub-memory may have a faster data input/output speed than the first sub-memory.

The setting may include designating a size of the data read one time from the first sub-memory.

The setting may include setting whether to use the cache memory based on a readahead algorithm provided by LINUX.

The cache memory may have a faster data input/output speed than the at least one sub-memory.

According to one or more exemplary embodiments, there is provided a method of controlling an image processing apparatus which comprises a main memory, at least one sub-memory which stores data, a setting indicating whether to temporarily store data in a cache memory being previously set for each of the at least one sub-memory, and a cache memory which temporarily stores data. The method comprises reading data from one of the at least one sub-memory; and selectively performing temporary storage of the read data in the cache memory prior to storing the data in the main memory based on the setting for the one of the at least one sub-memory.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
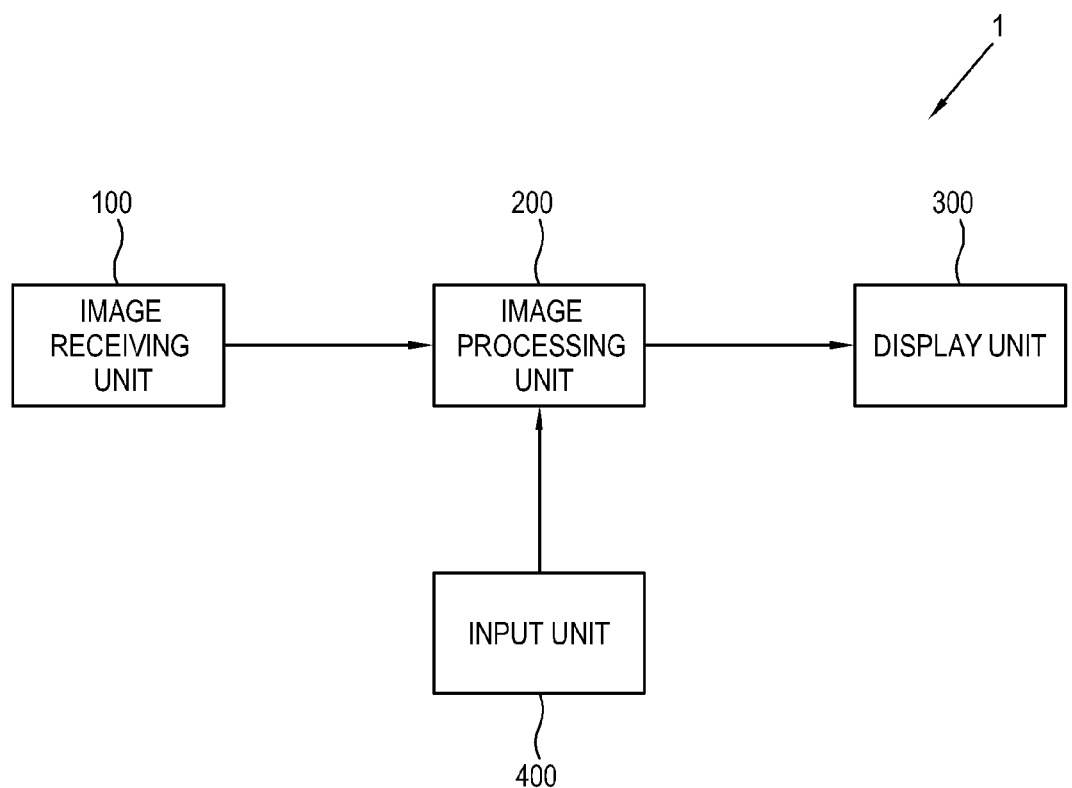
FIG. 1 is a block diagram illustrating a configuration of an image processing apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram illustrating a configuration of an image processing apparatus 1 according to an exemplary embodiment. The image processing apparatus 1 according to the exemplary embodiment includes a display unit 300 and is realized as a TV which receives a radio frequency (RF) image signal transmitted from a broadcasting station to display a broadcast image. However, the present exemplary embodiment is not limited thereto but may be applicable to various image processing apparatuses, e.g., a set-top box which does not include a display unit but processes an image signal to output the image signal to an external TV.

As shown in FIG. 1, the image processing apparatus 1 includes an image receiving unit 100 to receive an image signal from the outside, an image processing unit 200 to process an image signal received by the image receiving unit 100 by various preset image processing processes, the display unit 300 to display an image based on an image signal processed by the image processing unit 200, and an input unit 400 to perform a preset input with respect to an operation of the image processing apparatus 1. The input unit 400 may be manipulated by a user to perform the preset input.

Hereinafter, each component of the image processing apparatus 1 will be described.

The image receiving unit 100 receives an analog or digital image signal from an outside image supply source (not shown). The image receiving unit 100 may be realized in various forms depending on the standard on which the image signal is based and the type of the image processing apparatus 1. For example, the image receiving unit 100 may receive a radio frequency (RF) signal transmitted from a broadcasting station (not shown) by wireless, or may receive image signals in composite video, component video, super video, Syndicat des Constructeurs d'Appareils Radiorécepteurs et Téléviseurs (SCART), and high definition multimedia interface (HDMI) standards by cable. When an image signal is an RF broadcast signal, the image receiving unit 100 includes a tuner to tune the broadcast signal by channels.

The image processing unit 200 performs various preset processes on the image signals for image processing. The image processing unit 200 performs processes to output image signals to the display unit 300, thereby displaying an image on the display unit 300.

As examples of the processes, the image processing unit 200 may convert an analog image signal into a digital image signal, demodulate (i.e., frequency shifting) an image signal to baseband, decode image and audio formats, perform de-interlacing, perform frame refresh rate conversion, perform scaling, perform detail enhancement, perform line scanning, and the like. However, the processes are not limited to these, and may include any image-related process that is capable of being performed on image data.

The display unit 300 may be realized as a liquid crystal display or plasma display panel, and displays an image signal that is processed by the image processing unit 200 into an image. When the display unit 300 is realized as a liquid crystal display, a plurality of horizontal scan lines scanned from the image processing unit 200 are arranged vertically in a display region of the display 300 to display an image frame or image field.

The input unit 400 generates a preset control signal associated with an operation of the image processing apparatus 1 to transmit the control signal to the image processing unit 200. The input unit 400 may be realized in various forms and may include, for example, a remote control or keyboard which enables input of letters.

Hereinafter, a configuration of the image processing unit 200 according to an exemplary embodiment will be described with reference to FIG. 2.

Figure 2:
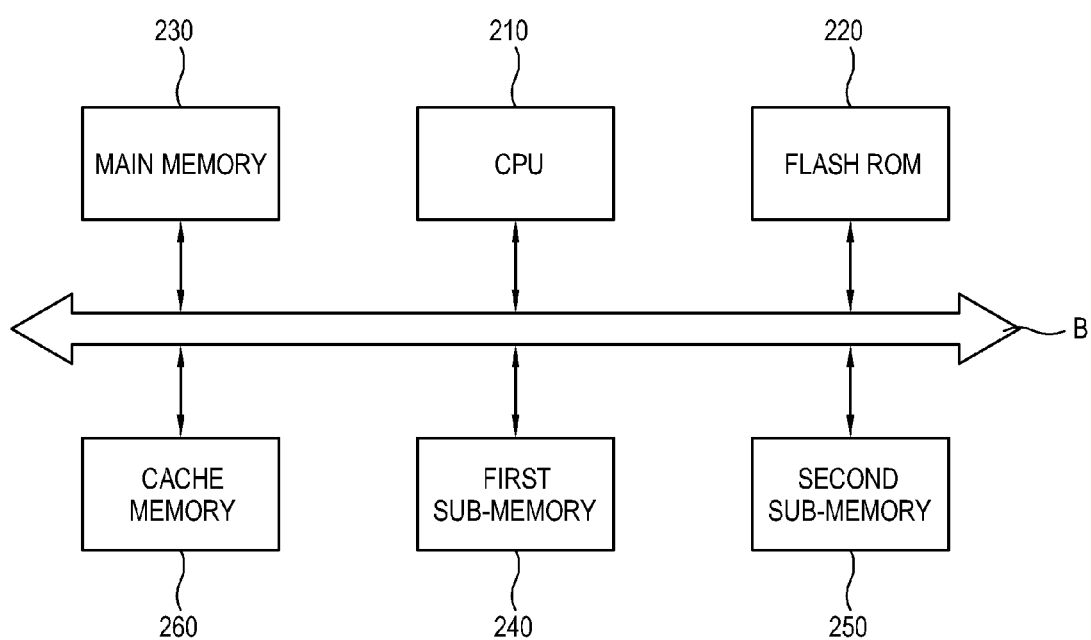
FIG. 2 is a block diagram illustrating a configuration of an image processing unit associated with a system bus in the image processing apparatus of FIG. 1.

FIG. 2 is a block diagram illustrating a connection structure of the image processing unit 200 with respect to a system bus B in the image forming apparatus 1. It should be noted that FIG. 2 does not show all components of the image processing unit 200 but shows only components directly associated with the present embodiment.

As shown in FIG. 2, the image processing unit 200 includes a central processing unit (CPU) 210 to implement and process data, a flash read-only memory (ROM) 220 to store setting information to which the CPU refers, a main memory 230 in which data processed by the CPU 210 is loaded, a first sub-memory 240 and a second sub-memory 250 to store data, and a cache memory 260 to temporarily store data stored in the sub-memories before the data is loaded to the main memory 230. The above components are connected to the system bus B to enable transmission and access of data.

The CPU 210 is allowed to access data stored or loaded in each component, and loads data to be processed to the main memory 230 and then implements the data. Data implemented by the CPU 210 is not limited, and may include digitalized image data or system driving data such as data used in an operating system or for applications having various functions.

The CPU 210 accesses the flash ROM 220 to refer to the setting information stored in the flash ROM 220 when implementing data. Further, when the setting information is adjusted by the input unit 400, the CPU 210 may update the setting information in the flash ROM 220 accordingly. That is, when setting information about an operation is stored in the flash ROM 220, the CPU 210 implements data based on the setting information.

In the present exemplary embodiment, updating the setting information is performed by the CPU 210 but is not limited thereto. Alternatively, a micro-controller (not shown) may be provided to update the setting information in the flash ROM 220.

The main memory 230 is loaded with data implemented and processed by the CPU 210 from the first sub-memory 240 and the second sub-memory 250. That is, first, data is loaded to the main memory 230 for the CPU 210 to implement the data. The main memory 230 has addresses associated with a data loading area, and the CPU 210 accesses each address and implements data loaded in a corresponding address. The main memory 230 is realized as a random access memory (RAM) which is volatile memory that does not keep data when the power is turned off.

At least one of the first sub-memory 240 and the second sub-memory 250 is connected to the system bus B, and the first sub-memory 240 and the second sub-memory 250 store data of various characteristics. The first sub-memory 240 and the second sub-memory 250 may be installed in the image processing apparatus 1 or may be connected to the image processing apparatus 1 as an external peripheral device. The first sub-memory 240 and the second sub-memory 250 are non-volatile memories which do not lose data when power is turned off and may be realized as a flash memory, a hard disc drive (HDD), a solid state drive (SDD), an optical disc drive (ODD) such as digital video disc (DVD) or blue ray, and the like.

According to the present exemplary embodiment, a plurality of sub-memories are provided, and data is stored separately in each of the first sub-memory 240 and the second sub-memory 250 based on characteristics of the data. For example, the first sub-memory 240 may store image data and the second sub-memory 250 may store system driving data. Here, the first sub-memory 240 stores high-capacity image data, and thus the first sub-memory 240 is realized as an HDD or ODD. The second sub-memory 250 stores low-capacity dispersed system driving data, and thus the second sub-memory 250 may be realized as a flash memory. However, the above configurations of the first sub-memory 240 and the second sub-memory 250 are only illustrative examples and do not limit the scope of the present exemplary embodiment. For example, additional sub-memories may be provided to store additional types of data, depending on the application.

The cache memory 260 is provided so that data stored in the first sub-memory 240 and the second sub-memory 250 is not directly loaded to the main memory 230 but is stored temporarily in the cache memory 260 from the first sub-memory 240 and the second sub-memory 250, and then the data stored in the cache memory 250 is loaded to the main memory 230.

Although a data input/output speed (i.e., a data transfer speed) of the first sub-memory 240 and the second sub-memory 250 is different depending on a type of the sub-memory, generally a data input/output speed of the first sub-memory 240 and the second sub-memory 250 is significantly slower as compared with a processing speed of the CPU 210. That is, a speed at which data is read out from the first sub-memory 240 and the second sub-memory 250 and loaded to the main memory 230 is remarkably slower than a speed at which the CPU 210 processes data loaded in the main memory 230. Here, the CPU 210 stands by until data to be processed is loaded to the main memory 230, so that an overall processing speed of a system becomes relatively slow.

Thus, when the CPU 210 implements data, the data is not directly loaded to the main memory 230 from the first sub-memory 240 and the second sub-memory 250 but is loaded from the first sub-memory 240 and the second sub-memory 250 to the main memory 230 via the cache memory 260. Here, the cache memory 260 is not limited to a specific type but may be realized to have a data input/output speed which is fast as compared with those of the first sub-memory 240 and the second sub-memory 250.

As described above, data to be processed by the CPU 210 is temporarily stored in the cache memory 260 and then loaded to the main memory 230. Thus, it is expected that the overall processing speed of the system will be improved by using the cache memory 260 as compared with when the data is loaded directly to the main memory 230 from the first sub-memory 240 and the second sub-memory 250

However, when applying the cache memory 260, there are some cases in which it is not expected that a processing speed of the system is improved, as described further below.

In the present exemplary embodiment, the first sub-memory 240 stores image data and the second sub-memory 250 stores system driving data.

Here, loading data stored in the first sub-memory 240 to the main memory 230 via the cache memory 260 is advantageous in view of speed. The data stored in the first sub-memory 240 is generally high-capacity, and the data is sequentially processed as image frames are sequentially displayed. Thus, the data is temporarily stored in the cache memory 260 by a sequential code, and it is expected that the processing speed will be improved.

Meanwhile, loading data stored in the second sub-memory 250 to the main memory 230 via the cache memory 260 is not advantageous in view of speed. The system driving data stored in the second sub-memory 250 includes a plurality of low-capacity files that are dispersed, and respective codes or files are not read sequentially but read randomly according to processes implemented by the CPU 210. Thus, when the cache memory 260 is used in the same manner as in the first sub-memory 240, a page fault, which is an error that a file or code to be processed by the CPU 210 does not exist in the cache memory 260, may tend to occur.

Thus, when loading data stored in the second sub-memory 250 to the main memory 230, a processing speed is relatively fast in loading the data directly to the main memory 230 as compared with loading the data via the cache memory 260.

Further, the second sub-memory 250 is generally low-capacity as compared with the first sub-memory 240 but is realized as hardware so that a data input/output speed is fast, and thus an overall speed of the system is not substantially improved despite use of the cache memory 260.

Thus, the CPU 210 according to the present exemplary embodiment controls the respective first sub-memory 240 and the second sub-memory 250 to preset whether to temporarily store data in the cache memory 260, and to selectively implement one of a first loading operation and a second loading operation based on settings of the first sub-memory 240 and the second sub-memory 250 for reading data. The first load operation includes temporarily storing the data in the cache memory 260, and the second loading operation includes loading data from the first sub-memory 240 and the second sub-memory 250 directly to the main memory 230 without storing the data in the cache memory 260. Accordingly, the overall processing speed of the system is improved.

Hereinafter, the present exemplary embodiment will be further described with respect to a configuration to selectively apply use of the cache memory 260 when loading data to the main memory 230. In the present exemplary embodiment, the image processing apparatus 1 operates based on a LINUX operating system. However, various operating systems may be applied to the image processing apparatus 1, and the kind of the operating system and an algorithm used do not limit the scope of the present exemplary embodiment.

Initially, setting information about selective use of the cache memory 260 is input through the input unit 400. The setting information is stored in the flash ROM 220 for the CPU 210 to refer to.

When an operating system is LINUX, an algorithm, readahead, is provided to temporarily store data in the cache memory 260. Readahead is code to perform a file prefetching function of LINUX, and when the function is activated, a predetermined capacity of a data code is temporarily stored in the cache memory 260 from the first sub-memory 240 and the second sub-memory 250 to improve a data reading speed. Readahead is an algorithm provided by a known system, LINUX, and thus description thereof is omitted.

The CPU 210 may identify the respective first sub-memory 240 and the second sub-memory 250 based on IDs allocated to the respective first sub-memory 240 and the second sub-memory 250. For example, there is a case where an ID of the first sub-memory 240 is mmr1, and an ID of the second sub-memory 250 is mmr2.

In this instance, an example of an instruction in a prompt to direct to activate the readahead function on the first sub-memory 240 is as follows.

$ echo 1>/proc/sys/fs/readahead/mmr1

Here, "$" is not an instruction but a prompt. "1" denotes readahead to be on, and "mmr1" is the ID of the first sub-memory 240. Further, "/proc/sys/fs/readahead" denotes a location of the algorithm of readahead in a system driving file and may be different depending on the image processing apparatus 1.

When the above instruction is input in the prompt through the input unit 400, input information is stored in the flash ROM 220 for the CPU 210 to refer to.

Since the above instruction does not designate a size of data read one time from the first sub-memory 240, the size of data read one time from the first sub-memory 240 is a default value. Instead, the size of data read one time from the first sub-memory 240 is designated in the instruction, and an example thereof is as follows.

$ echo 1 64>/proc/sys/fs/readahead/mmr1

The instruction further includes "64" as compared with the previous instruction, which means when reading data one time from the first sub-memory 240, 64 pages are read and temporarily stored in the cache memory 260. One page corresponds to 4 kilobytes.

Meanwhile, an example of an instruction in a prompt to direct not to activate the readahead function on the second sub-memory 250 is as follows.

$ echo 0>/proc/sys/fs/readahead/mmr2

"0" denotes readahead to be off, and "mmr2" is the ID of the second sub-memory 250.

When setting an instruction as above, the CPU 210 selectively applies use of the cache memory 260 based on setting information of each of the first sub-memory 240 and the second sub-memory 250 when reading data from the first sub-memory 240 and the second sub-memory 250, respectively.

When reading data from the first sub-memory 240, the CPU 210 temporarily store the data read from the first sub-memory 240 in the cache memory 260 and loads the data temporarily stored in the cache memory 260 to the main memory 230 based on setting information stored in the flash ROM 220. Accordingly, when processing the image data stored in the first sub-memory 240, frames may be displayed into an image without delays.

When reading data from the second sub-memory 250, the CPU 210 loads the data read from the second sub-memory 250 directly to the main memory 230 without using the cache memory 260 based on setting information stored in the flash ROM 220. Accordingly, when processing the system driving data stored in the second sub-memory 250, a plurality of low-capacity dispersed data may efficiently be loaded to the main memory 230 and implemented.

As describe above, according to the present exemplary embodiment, whether to use the cache memory 260 is preset by the respective first sub-memory 240 and second sub-memory 250, and the cache memory 260 is selectively used based on preset information when reading data from the respective first sub-memory 240 and second sub-memory 250, thereby improving an overall speed of the system.

Meanwhile, in the above exemplary embodiment, the cache memory 260 is an independent component, but is not limited thereto. For example, a part of the main memory 230 may be allocated for the cache memory 260.

Further, when the first sub-memory 240 is realized as a separate ODD from the image processing apparatus 1, the CPU 210 processes digital image data received through the image receiving unit 100 to be displayed as an image. In this instance, the scope of the present exemplary embodiment may also be applicable.

In addition, although setting information input through the input unit 400 is stored in the flash ROM 220 in the present exemplary embodiment, the setting information may be stored in any type as long as the CPU 210 refers to the setting information.

Meanwhile, whether to use the cache memory 260 is preset by the user with respect to the respective first sub-memory 240 and second sub-memory 250, to be stored as setting information in the present exemplary embodiment, but the CPU 210 may generate the setting information automatically.

For example, each of the first sub-memory 240 and the second sub-memory 250 includes firmware, and hardware information about regarding whether each of the first sub-memory 240 and the second sub-memory 250 is an HDD, ODD, or flash memory may be recorded in the firmware.

While the first sub-memory 240 and the second sub-memory 250 are connected to the system bus B, the CPU 210 reads information about hardware characteristics from the firmware of the first sub-memory 240 and the second sub-memory 250 and generates setting information about the first sub-memory 240 and the second sub-memory 250 based on the read information. For example, when determining the first sub-memory 240 as an HDD or ODD, the CPU 210 may perform setting correspondingly to a case where the first sub-memory 240 uses the cache memory 260. When determining the second sub-memory 250 as a flash memory, the CPU 210 may perform setting correspondingly to a case where the second sub-memory 250 does not use the cache memory 260.

Figure 3:
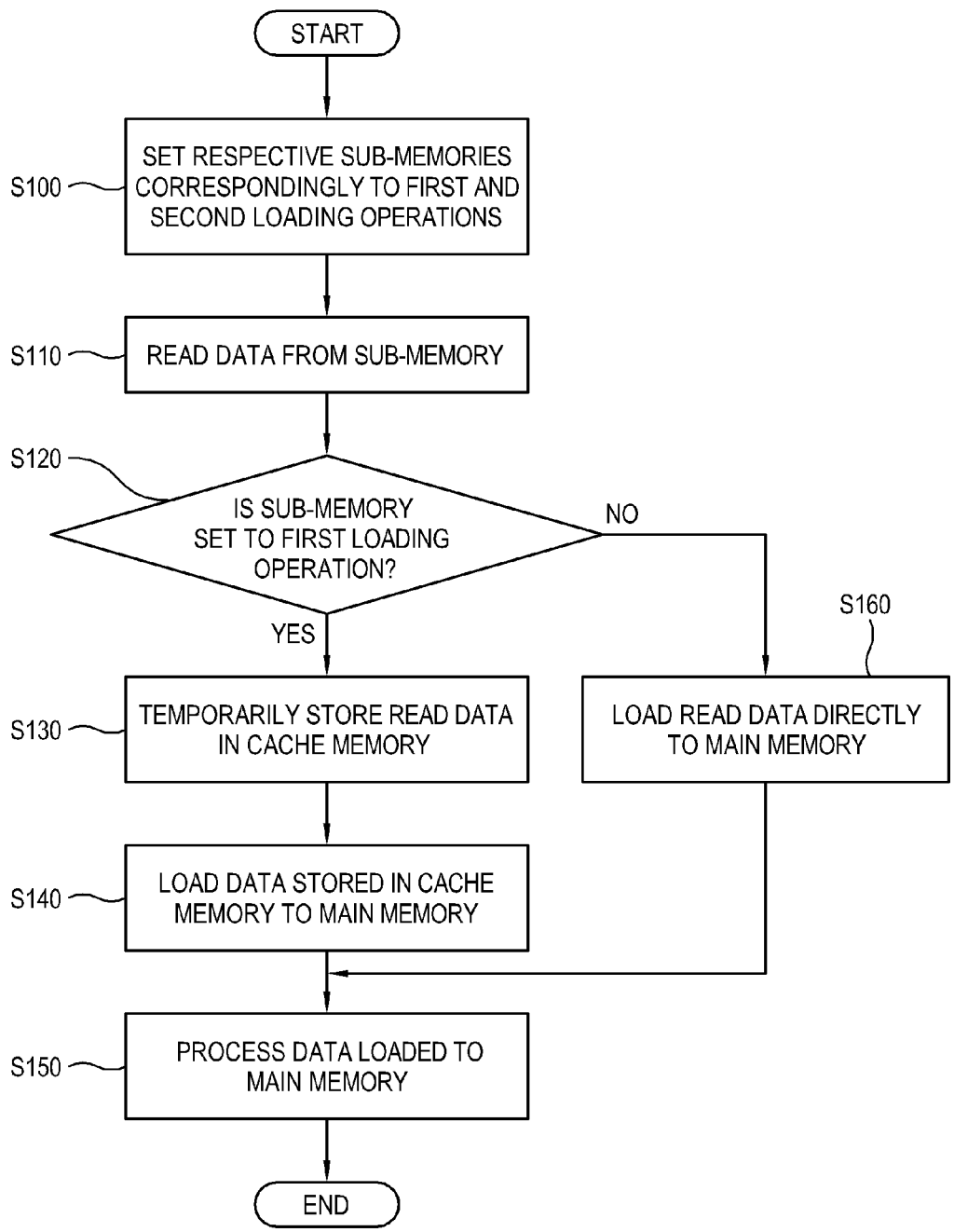
FIG. 3 is a flowchart illustrating a process of controlling the image processing apparatus of FIG. 1.

Hereinafter, a method of controlling the image processing apparatus 1 according to the present exemplary embodiment will be described with reference to FIG. 3. FIG. 3 is a flowchart to illustrating a process of controlling the image processing apparatus 1.

As shown in FIG. 3, a first loading operation and a second loading operation are set with respect to the respective first sub-memory 240 and second sub-memory 250 (S100). Here, the first loading operation is a loading operation in which data is loaded to the main memory 230 via the cache memory 260, and the second loading operation is a loading operation in which data is loaded directly to the main memory 230 without passing through the cache memory 260.

The CPU 210 reads data from one of the first sub-memory 240 and the second sub-memory 250 (S110). Here, the CPU 210 determines whether the sub-memory from which the data is read is set correspondingly to the first loading operation (S120).

When it is determined that the sub-memory is set to the first loading operation, the CPU 120 temporarily stores the data read from the sub-memory in the cache memory 260 (S130). The data stored in the cache memory 260 is then loaded to the main memory 230 (S140), and the CPU 210 processes and implements the data loaded in the main memory 230 (S150).

On the other hand, in operation S120, when it is determined that the sub-memory is set not to the first loading operation but to the second loading operation, the CPU 120 loads the data read from the sub-memory directly to the main memory 230 (S160). Then, the CPU 210 processes and implements the data loaded to the main memory 230 (S150).

In the present exemplary embodiment, as described above, whether to use the cache memory 260 may selectively be set for each of the first sub-memory 240 and the second sub-memory 250 to read data.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   a main memory;
   at least one sub-memory which stores data;
   a cache memory that is configured to temporarily store data; and
   a controller which controls, when transferring the data from the at least one sub-memory to the main memory, whether to temporarily store the data in the cache memory, or to transfer the data directly from the sub-memory to the main memory selectively with respect to each of the at least one sub-memory,
   wherein the controller sets, for each of the at least one sub-memory, whether to temporarily store the data in the cache memory differently based on characteristics of the data stored in the at least one sub-memory.

2. The image processing apparatus of claim 1, wherein, when the data stored in the first sub-memory is image data, the controller sets the data read from a first sub-memory of the at least one sub-memory to be temporarily stored in the cache memory.

3. The image processing apparatus of claim 1, wherein, when the data stored in the second sub-memory is system driving data, the controller sets the data read from a second sub-memory of the at least one sub-memory not to be temporarily stored in the cache memory.

4. The image processing apparatus of claim 1, wherein the at least one sub-memory comprises a first sub-memory which stores image data and a second sub-memory which stores system driving data of the image processing apparatus, and the second sub-memory has a faster data transfer speed than the first sub-memory.

5. The image processing apparatus of claim 4, wherein the first sub-memory comprises at least one of a hard disk drive, a digital video disc (DVD) player, and a blue ray disk player.

6. The image processing apparatus of claim 4, wherein the second sub-memory comprises a flash memory.

7. The image processing apparatus of claim 4, wherein the controller designates a size of the data read one time from the first sub-memory.

8. The image processing apparatus of claim 1, wherein the controller sets whether to use the cache memory based on a readahead algorithm provided by LINUX.

9. The image processing apparatus of claim 1, further comprising an input unit provided to set whether to temporarily store the data in the cache memory for each of the at least one sub-memory.

10. The image processing apparatus of claim 1, wherein the cache memory has a faster data transfer speed than the at least one sub-memory.

11. A method of controlling an image processing apparatus which includes a main memory, at least one sub-memory which stores data, and a cache memory which temporarily stores the data before loading the data from the at least one sub-memory to the main memory, the method comprising:
   setting, for each of the at least one sub-memory, whether to temporarily store data in the cache memory;
   reading data from one of the at least one sub-memory; and
   selectively performing temporary storage of the read data in the cache memory based on the setting for the one of the at least one sub-memory for reading the data.

12. The method of claim 11, wherein the setting comprises setting, for each of the at least one sub-memory, whether to temporarily store the data in the cache memory differently based on characteristics of the data stored in the at least one sub-memory.

13. The method of claim 12, wherein the setting comprises, when the data stored in the first sub-memory is image data, setting the data read from a first sub-memory of the at least one sub-memory to be temporarily stored in the cache memory.

14. The method of claim 12, wherein the setting comprises, when the data stored in the second sub-memory is system driving data, setting the data read from a second sub-memory of the at least one sub-memory not to be temporarily stored in the cache memory.

15. The method of claim 11, wherein the at least one sub-memory comprises a first sub-memory which stores image data and a second sub-memory which stores system driving data of the image processing apparatus, and the second sub-memory has a faster data transfer speed than the first sub-memory.

16. The method of claim 15, wherein the setting comprises designating a size of the data read one time from the first sub-memory.

17. The method of claim 11, wherein the setting comprises setting whether to use the cache memory based on a readahead algorithm provided by LINUX.

18. The method of claim 11, wherein the cache memory has a faster data transfer speed than the at least one sub-memory.

19. A method of controlling an image processing apparatus which includes a main memory, at least one sub-memory which stores data, a cache memory which temporarily stores data, a setting indicating whether to temporarily store data in the cache memory being previously set for each of the at least one sub-memory, the method comprising:

reading data from one of the at least one sub-memory; and
selectively performing temporary storage of the read data in the cache memory prior to storing the data in the main memory based on the setting for the one of the at least one sub-memory.

\* \* \* \* \*